N. DE LONG.
WASHER CUTTER.
APPLICATION FILED APR. 15, 1912, RENEWED AUG. 16, 1918.
1,299,688.
Patented Apr. 8, 1919.
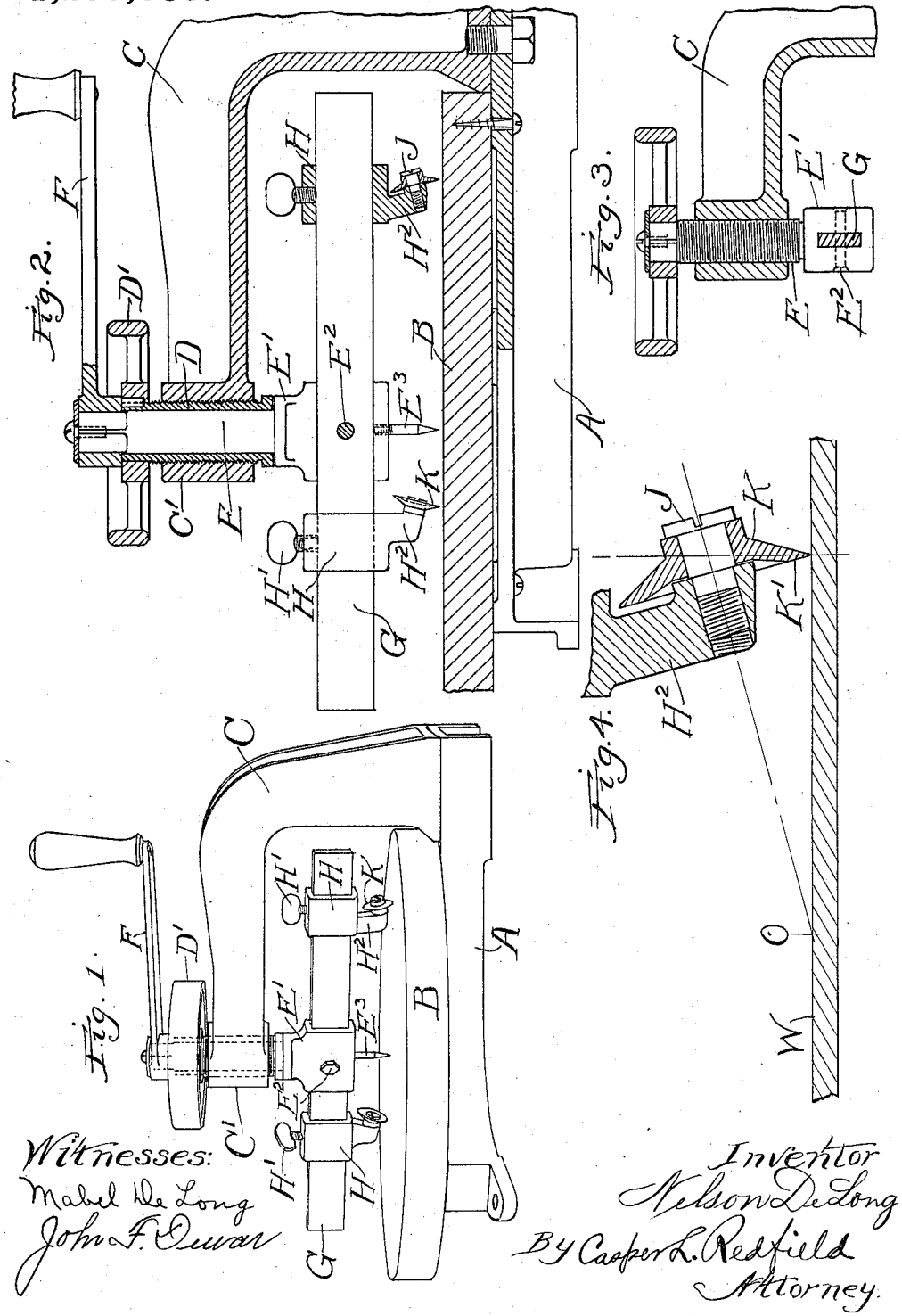

UNITED STATES PATENT OFFICE.

NELSON DE LONG, OF CHICAGO, ILLINOIS.

WASHER-CUTTER.

1,299,688.  Specification of Letters Patent.  Patented Apr. 8, 1919.

Application filed April 15, 1912, Serial No. 690,992. Renewed August 16, 1918. Serial No. 250,241.

*To all whom it may concern:*

Be it known that I, NELSON DE LONG, a citizen of the United States of America, and a resident of Chicago, county of Cook, and State of Illinois, have invented certain new and useful Improvements in Washer-Cutters, of which the following is a specification.

My invention relates to washer cutters, and has for its object improvements in devices for cutting large washers, particularly from hard and resisting materials.

In the accompanying drawings

Figure 1 is a perspective view;

Fig. 2 is a sectional elevation at a slightly larger scale than Fig. 1;

Fig. 3 is a modification of the feeding device particularly applicable when the washers to be cut are not of an unusually hard material; and Fig. 4 is an enlarged section showing the construction and manner of holding the cutters.

In the said drawings A is a base on which is secured a board B. Also secured to the base A is a standard C having a boss $C^1$ located above the center of the board B. The boss $C^1$ is bored and internally threaded to receive an externally threaded bushing D on which is secured a hand wheel $D^1$. Running through the bushing D is a spindle E having a bar-holding head $E^1$ on its lower end. A handle F secured to the upper end of the spindle serves to turn it in the bushing D.

Secured in the head $E^1$ by a bolt $E^2$ is a bar G, the length of which is equal to or slightly more than the diameter of the largest washer to be cut on the machine. The bar G is parallel with the upper face of the board or table B, and on this bar are mounted the tool carrying heads H. These tool carrying heads are adjustable longitudinally on the bar G and are secured in any desired positions by means of the thumb screws $H^1$.

On the lower part of each head H is a projection $H^2$, and in each projection is a stud or bearing pin J. These studs or pins have their axes at an angle to the face of the table B, and mounted to loosely rotate on the pins are rollers K. These rollers are dished, as shown in Fig. 4, and are the cutters used in cutting washers from the material W, which material is placed loosely upon the table B. A pin $E^3$ (Fig. 1) is sometimes used to prick a central hole in the material and thus hold the material from slipping on the table during the cutting process. Normally there is sufficient friction between the material and the table B to prevent such slipping, hence this pin is only used when the material being cut is of a kind liable to slip, or the conditions of cutting are liable to cause slipping.

The angle of the pin J is an important matter, and is determined by the relative diameters of the circle to be cut and the cutting rollers K. A given pin and a given cutter will cut washers easily within a given range of sizes. They will also serve to cut washers either larger or smaller than the extremes of this range, but will do so less easily. Taking the medium size in any given range of sizes of circles to be cut, the angle of the pin J and the diameter of the cutter K are related to each other so that the point O (Fig. 4) on the extended axis of the pin J is the apex, and the face of the cutter K is the base, of a cone which has its apex under the center of the axis of the spindle E. When so constructed, and the spindle E is turned by the handle F, the cutter will roll as a cone on the material W without any tendency to cause the material to slip. When the head H is moved longitudinally on the bar G so that the apex of the imaginary cone does not coincide with the extended axis of the spindle E, there is a tendency to displace the material on the table B, but this tendency is not sufficient to overcome the friction between the material W and the table B unless the cutter is moved beyond the range of sizes which it is intended to cut. By the use of the pin $E^3$ for holding the material the cutter may be used considerably beyond its normal range. By replacing a cutter of a given diameter on a given pin J by another cutter of a greater or less diameter, a greater or less diameter of circle may be cut without displacing the apex of the cone.

One of the cutters K is used for cutting the washer from a sheet and consequently travels in a circle whose diameter is the diameter of the desired washer. The other cutter K is used for cutting the hole in the washer and consequently travels in a smaller circle whose diameter is the diameter of the desired hole. If both cutters are of the same diameter, and it is usually preferable to make them so, then the cutter which cuts the hole in the washer is placed on a pin which has a greater angle to the table B than is the pin which holds the cutter for cutting the outside of the washer. This is because, while the bases of the two cones are of the same diameter, the distances from the bases to the apexes is different.

It is to be observed that the two cutters K are supported on opposite sides of the spindle E, and consequently that upward pressure on the cutters in the cutting action is balanced to a greater or less extent. Also, that the heads H are freely movable on the bar G, and may be readily removed therefrom when desired. By applying several heads H with each machine, each head having its pin J at a different angle and each marked with the range of sizes for which it is intended it shall be used, I can cut all sizes of washers with the same size of cutters and can cut any size of hole in any size of washer. To cut blind washers I may use one cutter alone, but it is preferable to use two heads of the same range, one head on each end of the bar to equalize the upward pressure on the spindle E. In cutting a large washer with a small hole I may use one cutter for the outside and another for the inside, but it is preferable to use two cutters for the outside, one on each end of the bar G, and a third cutter for the hole. By this last means the upward pressure is equalized.

In operating the machine the material is laid on the table B and the heads H are set for cutting the outside and the inside of the washer. To facilitate this setting the bar G may be graduated in a manner which will be understood without detailed description. The wheel $D^1$ is then turned so as to lower the cutters until they are pressed slightly into the material. By then turning the handle F the cutters K are made to travel in circles, rolling on and cutting into the material as they travel. By turning the wheel $D^1$ to feed the cutters downward as the handle F is turned, the cutters cut deeper and deeper into the material until the washer is finally completed. In machines for cutting comparatively soft material, the feed screw may be placed directly on the spindle E, as shown in Fig. 3, and the same handle or hand wheel may be used for both feeding and cutting.

The construction of the cutter is shown in detail in Fig. 4. By inspection it will be seen that the cutting edge is a V with equal angles on each side of a line perpendicular to the face of the material to be cut. As so made the forcing of the cutter into the material does not produce any lateral thrust on either the cutter or the material. After the cutter has traveled in one complete circle and produced a groove or channel in the material to be cut, it will, in its subsequent travels, tend to follow in that groove even when the apex of the imaginary cone does not coincide with the axis of the spindle E.

As before stated, the cutters are dished, and the cutting edge is a V having equal angles on each side of a perpendicular to the face of the material to be cut. This construction facilitates the grinding of the cutters without destroying the accuracy of the cutting edge. When a cutter becomes dull by use, it is removed from its pin J and the face $K^1$ is placed against a flat grinding surface, as the side of a grindstone or an emery wheel.

I have hereinbefore described the cutters as being fed downward and subsequently raised by turning the hand wheel $D^1$ which is secured to the bushing D. As a matter of fact, in the construction shown and described, the hand wheel $D^1$ is unnecessary in ordinary work as the bushing moves downward and upward by superior friction with the spindle E, the head $E^1$ and the hub of the handle F when the direction of turning the handle F in cutting and elevating is in the direction which would cause a downward and upward movement of the bushing if it were secured to the handle. When the cutters engage the material to be cut with a force sufficient to cause a strong upward thrust which is conveyed through the head $E^1$ to the bushing D, then the wedging action between the threads of the bushing and the threads of the boss $C^1$ cause the friction of the screw to be superior to the friction between the bushing and the other parts, with the result that the feed automatically ceases until this thrust is relieved by the cutters cutting into the material. When the upward thrust is thus relieved, then the feed downward automatically begins again. This automatic feed is controlled to a greater or less extent by the operator pressing down on the handle as he turns it in the cutting operation.

What I claim is:

1. The combination with two rolling cutters, and means for causing them to travel about a common center in circles of different diameters and in contact with material to be cut, of pivotal supports for said cutters so arranged that the cutters form bases of cones whose apexes are at or near the common center.

2. The combination with two rolling cutters located on opposite sides of a common center, and means for causing them to travel in circles about such common center and in contact with material to be cut, of pivotal supports of said cutters so arranged that the cutters form bases of cones whose apexes are at or near the common center.

3. A spindle provided with cutters adapted to cause an upward axial thrust on said spindle when the cutters are operated to cut material, a handle by which the spindle is turned, a bearing in the form of a bushing having external threads and located between the handle and a shoulder on the spindle, and a stationary nut in which the bushing is turned to feed the cutters toward material to be cut, said handle having a frictional contact with the end of the bushing which frictional contacts serves to turn the bushing and feed the cutters when the upward thrust of the cutters is reduced to reduce the frictional thrust between the threads of the bushing and the threads of the nut.

Signed at Chicago, Ill., this 13th day of April, 1912.

NELSON DE LONG.

Witnesses:
WALTER H. REDFIELD,
C. L. REDFIELD.